(12) United States Patent
MacKenzie

(10) Patent No.: US 7,076,656 B2
(45) Date of Patent: *Jul. 11, 2006

(54) METHODS AND APPARATUS FOR PROVIDING EFFICIENT PASSWORD-AUTHENTICATED KEY EXCHANGE

(75) Inventor: Philip D. MacKenzie, Maplewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 678 days.

This patent is subject to a terminal disclaimer.

(21) Appl. No.: 09/827,227

(22) Filed: Apr. 5, 2001

(65) Prior Publication Data

US 2002/0194478 A1    Dec. 19, 2002

(51) Int. Cl.
    *H04L 9/32*    (2006.01)
    *H04L 9/28*    (2006.01)
(52) U.S. Cl. .................... 713/171; 713/169; 380/28
(58) Field of Classification Search ............ 713/171, 713/169, 183, 200–202; 380/255, 278, 28
    See application file for complete search history.

(56) References Cited

U.S. PATENT DOCUMENTS

| | | | | |
|---|---|---|---|---|
| 4,956,863 A | * | 9/1990 | Goss | 380/30 |
| 5,241,599 A | | 8/1993 | Bellovin et al. | |
| 5,351,293 A | * | 9/1994 | Michener et al. | 713/171 |
| 5,440,635 A | | 8/1995 | Bellovin et al. | |
| 5,450,493 A | * | 9/1995 | Maher | 380/30 |
| 5,602,917 A | * | 2/1997 | Mueller | 380/284 |
| 6,028,937 A | * | 2/2000 | Tatebayashi et al. | 713/169 |
| 6,226,383 B1 | * | 5/2001 | Jablon | 380/30 |
| 6,539,479 B1 | * | 3/2003 | Wu | 713/151 |
| 6,829,356 B1 | * | 12/2004 | Ford | 380/44 |
| 6,910,129 B1 | * | 6/2005 | Deng et al. | 713/171 |
| 6,993,651 B1 | * | 1/2006 | Wray et al. | 713/151 |
| 2001/0055388 A1 | * | 12/2001 | Kaliski, Jr. | 380/30 |
| 2004/0128517 A1 | * | 7/2004 | Drews et al. | 713/180 |

FOREIGN PATENT DOCUMENTS

EP    1 134 929 A1    9/2001

(Continued)

OTHER PUBLICATIONS

Li Gong, T. Mark A. Lomas, Roger M. Needham, Jerome H. Saltzer, Protecting Poorly Chosen Secrets from Guessing Attacks (1993) IEEE Journal on Selected Areas in Communications.*

(Continued)

*Primary Examiner*—Ayaz Sheikh
*Assistant Examiner*—Aravind K Moorthy

(57) ABSTRACT

A secure protocol is provided which uses a Diffie-Hellman type shared secret, but modified such that the two parties may authenticate each other using a shared password. In accordance with the invention, a party generates the Diffie-Hellman value $g^x$ and combines it with a function of at least the password using a group operation, wherein any portion of a result associated with the function that is outside the group is randomized. The resulting value is transmitted to the other party. The group operation is defined for the particular group being used. Every group has a group operation and a corresponding inverse group operation. Upon receipt of the value, the other party performs the inverse group operation on the received value and the function of at least the password, and removes the randomization of any portion of the result associated with the function that is outside the group, to extract $g^x$ such that the other party may then generate the shared secret $g^{xy}$ using its knowledge of y.

20 Claims, 4 Drawing Sheets

FOREIGN PATENT DOCUMENTS

| EP | 1248408 A2 | * | 10/2002 |
|---|---|---|---|
| WO | WO 2005055512 A2 | * | 6/2005 |

OTHER PUBLICATIONS

Schneier, Bruce, Applied Cryptography 1996 John Wiley & Sons, 2nd Edition.*

Oorcshot et al. On Diffie-Hellman Key Agreement with Short Exponents. Feb. 19, 1996, Proc. of Eurocrypt '96, Springer-Verlag LNCS.*

Seo et al, Simple Authenticated Key Agreement Algorithm, Jun. 1999, IEEE, vol. 35 Issue 13, pp. 1073-1074.*

Wang et al, Supervising Secret-Key Agreements in a Level-Based Hierarchy, 2004, IEEE, vol. 1, pp. 309-314.*

Yuh-Min Tseng, A Robust Multi-Party Key Agreement Protocol Resistant to Malicious Participants, May 2005, The Computer Journal, vol. 48 No. 4, pp. 480-487.*

Bhattacharya et al, Improving the Diffie-Hellman Secure Key Exchange, 2005, IEEE, vol. 1, pp. 193-197.*

U.S. Appl. No. 09/638,320, filed Aug. 14, 2000, V.V. Boyko et al., "Secure Mutual Network Authentication and Key Exchange Protocol."

U.S. Appl. No. 09/353,468, filed Jul. 13, 1999, P.D. MacKenzie et al., "Secure Mutual Network Authentication Protocol (SNAPI)."

D. Jablon, "Strong Password-Only Authenticated Key Exchange," ACM Computer Communications Review, ACM SIGCOMM, pp. 1-22, 1996.

S.M. Bellovin et al., "Encrypted Key Exchange: Password-Based Protocols Secure Against Dictionary Attacks," Proceedings of the IEEE Symposium on Research in Security and Privacy, pp. 72-84, 1992.

S.M. Bellovin et al., "Augmented Encrypted Key Exchange: A Password-Based Protocol Secure Against Dictionary Attacks and Password File Compromise," Proceedings of the First Annual Conference on Computer and Communications Security, pp. 1-7, 1993.

M. Steiner et al., "Refinement and Extension of Encrypted Key Exchange," ACM Operating System Review, pp. 1-9, 1994.

T. Wu, "The Secure Remote Password Protocol," Proceedings of the 1998 Internet Society Symposium on Network and Distributed System Security, pp. 1-17, 1997.

Stefan Lucks, "Open Key Exchange: How to Defeat Dictionary Attacks Without Encrypting Public Keys," Security Protocol Workshop, pp. 1-12, 1997.

M. Bellare et al., "Authenticated Key Exchange Secure Against Dictionary Attacks," Advances in Cryptology, pp. 1-16, Eurocrypt 2000.

S. Patel, "Number Theoretic Attacks on Secure Password Schemes," Proceedings of the IEEE Symposium on Research in Security and Privacy, pp. 236-247, 1997.

W. Diffie et al., "New Directions in Cryptography," IEEE Transactions on Information Theory, vol. IT 22, No. 6, pp. 644-654, 1976.

FIPS 180-1, "Secure Hash Standard," Federal Information Processing Standards Publication 180-1, pp. 1-21, 1995.

H. Dobbertin et al., RIPEMD-160: a Strengthened Version of RIPEMD, Fast Software Encryption, 3rd Intl. Workshop, pp. 1-13, 1996.

R.L. Rivest et al., "A Method for Obtaining Digital Signatures and Public-Key Cryptosystems," Communications of the ACM, vol. 21, No. 2, pp. 120-126, 1978.

D.P. Jablon, "Extended Password Key Exchange Protocols Immune to Dictionary Attack," WETICE Workshop on Enterprise Security, pp. 1-8, 1997.

V. Boyko et al., "Provably Secure Password-Authenticated Key Exchange Using Diffie-Hellman," Advances in Cryptology, Eurocrypt 2000, pp. 156-171, 2000.

* cited by examiner

METHODS AND APPARATUS FOR PROVIDING EFFICIENT PASSWORD-AUTHENTICATED KEY EXCHANGE

CROSS REFERENCE TO RELATED APPLICATIONS

The present application is related to the commonly assigned U.S. patent application identified by Ser. No. 09/638,320, filed on Aug. 14, 2000 in the name of V. V. Boyko et al. and entitled "Secure Mutual Network Authentication and Key Exchange Protocol," the disclosure of which is incorporated by reference herein.

FIELD OF THE INVENTION

The present invention generally relates to techniques for providing network authentication and key exchange and, more particularly, to techniques for improving the computational efficiency associated with such network authentication and key exchange.

BACKGROUND OF THE INVENTION

Authentication over a network is an important part of security for systems that allow remote clients to access network servers. Authentication is generally accomplished by verifying one or more of the following:

(i) something a user knows, e.g. a password;

(ii) something a user is, i.e., biometric information, such as a fingerprint; and (iii) something a user has, i.e., some identification token, such as a smart-card.

For example, an automatic teller machine (ATM) verifies two of these: something a user has, the ATM card, and something a user knows, a personal identification number (PIN). ATM authentication is significantly easier than authentication over a data network because the ATM itself is considered trusted hardware, such that it is trusted to verify the presence of the ATM card and to transfer the correct information securely to a central transaction server.

In addition to authentication, key exchange is an important part of communication across a data network. Once a client and server have been authenticated, a secure communication channel must be set up between them. This is generally accomplished by the client and server exchanging a key, called a session key, for use during communication subsequent to authentication.

Authentication over a data network, especially a public data network like the Internet, is difficult because the communication between the client and server is susceptible to many different types of attacks. For example, in an eavesdropping attack, an adversary may learn secret information by intercepting communication between the client and the server. If the adversary learns password information, the adversary may replay that information to the server to impersonate the legitimate client in what is called a replay attack. Replay attacks are effective even if the password sent from the client is encrypted because the adversary does not need to know the actual password, but instead must provide something to the server that the server expects from the legitimate client (in this case, an encrypted password). Another type of attack is a spoofing attack, in which an adversary impersonates the server, so that the client believes that it is communicating with the legitimate server, but instead is actually communicating with the adversary. In such an attack, the client may provide sensitive information to the adversary.

Further, in any password-based authentication protocol, there exists the possibility that passwords will be weak such that they are susceptible to dictionary attacks. A dictionary attack is a brute force attack on a password that is performed by testing a large number of likely passwords (e.g., all the words in an English dictionary) against some known information about the desired password. The known information may be publicly available or may have been obtained by the adversary through one of the above-described techniques. Dictionary attacks are often effective because users often choose easily remembered, and easily guessed, passwords.

There are various known techniques for network authentication. These known techniques will be divided into two classifications. The first classification includes those techniques that require persistent stored data on the client system. The second classification includes those techniques which do not require persistent stored data on the client system.

With respect to the first classification, persistent stored data may include either secret data (e.g., secret keys shared with the authenticating server) which must never be revealed, or non-secret but sensitive data (e.g., the authenticating server's public key) which must be tamper-proof. With either type of persistent data, extra security requirements are necessary to secure the data from attack from an adversary. Further, when using an authentication protocol which relies on both passwords and persistent stored data, a compromise of either may lead to a vulnerability of the other. For example, compromising a secret key may lead to a possible dictionary attack on the password. Another problem with this first class of protocols is that persistent stored data requires generation and distribution of keys, which can be cumbersome, and generally provides a less flexible system.

The second classification is called password-only authentication protocols because there is no requirement of persistent stored data at the client. The client only needs to be able to provide a legitimate password. The notion of providing strong security and authentication using potentially weak passwords seems to be contradictory. However, there exist several password-only user authentication and key exchange protocols that are designed to be secure. A description of these protocols may be found in D. Jablon, *Strong Password-Only Authenticated Key Exchange,* ACM Computer Communication Review, ACM SIGCOMM, 26(5): 5–20,1996, the disclosure of which is incorporated by reference herein. Some of the more notable of the password-only protocols include Encrypted Key Exchange (EKE) described in S. M. Bellovin and M. Merritt, *Encrypted Key Exchange: Password-Based Protocols Secure Against Dictionary Attacks,* Proceedings of the IEEE Symposium on Research in Security and Privacy, pp. 72–84, 1992; Augmented-EKE (A-EKE), S. M. Bellovin and M. Merritt, *Augmented Encrypted Key Exchange: A Password-Based Protocol Secure Against Dictionary Attacks and Password File Compromise,* Proceedings of the First Annual Conference on Computer and Communications Security, 1993, pages 244–250; Modified EKE (M-EKE), M. Steiner, G. Tsudik, and M. Waidner, *Refinement and Extension of Encrypted Key Exchange,* ACM Operating System Review, 29:22–30, 1995; Simple Password EKE (SPEKE) and Diffie-Hellman EKE (DH-EKE), both described in D. Jablon, *Strong Password-Only Authenticated Key Exchange,* ACM Computer Communication Review, ACM SIGCOMM, 26(5):5–20, 1996; Secure Remote Password Protocol (SRP), T. Wu, *The Secure Remote Password Protocol*, Proceedings of the 1998 Internet Society Network and Distributed System Security Symposium, pages 97–111, 1998; Open Key Exchange (OKE), Stefan Lucks, *Open Key Exchange: How to Defeat Dictionary Attacks Without Encrypting Public Keys*, Security Protocol Workshop, Ecole Normale Sup'erieure, Apr. 7–9, 1997; Authenticated Key Exchange (AKE), M. Bellare, D. Pointcheval, and P. Rogaway, Authenticated Key Exchange Secure Against Dictionary Attacks, Advances in Cryptology, pp.139–155, Eurocrypt 2000; and commonly assigned U.S. patent application identified by Ser. No. 09/353,468, filed on Jul. 13, 1999 in the name of P. D. MacKenzie et al. and entitled "Secure Mutual Network Authentication Protocol (SNAPI)," the disclosures of which are incorporated by reference herein.

The problem with most of the known password-only authentication protocols is that they have not been proven secure. In fact, the EKE protocol may be susceptible to a certain number of theoretic attacks as described in S. Patel, *Number Theoretic Attacks on Secure Password Scheme*, Proceedings of the IEEE Symposium on Research in Security and Privacy, pages 236–247, 1997, the disclosure of which is incorporated by reference herein. While the AKE protocol has been proven secure, it requires strong assumptions to prove security. Further, while the SNAPI protocol has also been proven secure, the protocol is based on the RSA algorithm rather than Diffie-Hellman.

Commonly assigned U.S. patent application identified by Ser. No. 09/638,320, filed on Aug. 14, 2000 in the name of V. V. Boyko et al. and entitled "Secure Mutual Network Authentication and Key Exchange Protocol," the disclosure of which is incorporated by reference herein, discloses a secure password-only mutual network authentication and key exchange protocol which is provably secure and uses a Diffie-Hellman type shared secret, but modified such that the two parties may authenticate each other using a shared password.

SUMMARY OF THE INVENTION

The present invention provides a secure password-only mutual network authentication protocol which is provably secure. In accordance with the inventive protocol, two parties generate a shared secret using a Diffie-Hellman type key exchange. As is known, in accordance with a Diffie-Hellman type key exchange, there is a group generator g for a particular group, an index x known to one party, an index y known to the other party, and the shared secret $g^{xy}$. One party generates $g^x$, the other party generates $g^y$, and the parties exchange these values so that each party may now generate the shared secret $g^{xy}$. While Diffie-Hellman defines a key exchange protocol, the protocol has no authentication aspects.

Thus, in accordance with the present invention, we provide a protocol which uses a Diffie-Hellman type shared secret, but modified such that the two parties may authenticate each other using a shared password. Further, we have proven that this protocol is secure. In accordance with the invention, a party generates the Diffie-Hellman value $g^x$ and combines it with a function of at least the password using a group operation, wherein any portion of a result associated with the function that is outside the group is randomized. The resulting value is transmitted to the other party. The group operation is defined for the particular group being used, and will be described in further detail below. For present purposes, it is sufficient to recognize that every group has a group operation and a corresponding inverse group operation.

Upon receipt of the value, the other party performs the inverse group operation on the received value and the function of at least the password, and removes the randomization of any portion of the result associated with the function that is outside the group, to extract $g^x$ such that the other party may then generate the shared secret $g^{xy}$ using its knowledge of y.

The use of the group operation and the inverse group operation in conjunction with a Diffie-Hellman type key exchange protocol as described herein provides benefits over password-only mutual network authentication protocols. The randomization of any portion of the result associated with the function that is outside the group reduces the computational intensity associated with the operations performed by the one party. Advantageously, the present invention provides a protocol which can be proven to be secure against attacks by adversaries which have access to the communication channel.

As described above, the Diffie-Hellman value $g^x$ is combined with a function of at least the password. The term "at least" is used because, in various embodiments, $g^x$ may be combined with a function of the password alone, or a function of the password along with identifiers of the parties to the protocol in order to ensure that the password is unique for any particular pair of parties.

In accordance with one embodiment of the invention, the parties may authenticate each other by computing a function of at least certain parameters, transmitting the computed value to the other party, and then each party checking the received value against its own computed value. The parameters used for the computation may be at least one of a party identifier, the Diffie-Hellman value ($g^x$ or $g^y$), the shared secret, and the shared password. By computing a function of at least one of these values, the parties may authenticate that the other party is in possession of the shared password.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Cryptography is a well-known technique for providing secure communication between two parties. Prior to describing various embodiments of the present invention, some background and basic terminology will be provided.

Informally, a function $f$ from a set S to a set T is a one-way function if $f(x)$ is easy to compute for all x in S but for most y in T, it is computationally infeasible to find any x in S where $f(x)=y$. One example of a one-way function is modular exponentiation. Let p be a large prime and g a generator of the multiplicative group mod p (that is, the numbers in the range 1, . . . , p-1). Then $f(x)=g^x$ mod p is generally assumed to be a one-way function. The inverse function, called the discrete log function, is difficult to compute. There are also other groups in which the discrete log function is difficult to compute, such as certain elliptic curve groups.

Let k and l denote security parameters, where k is the main security parameter and can be thought of as a general security parameter for hash functions and secret keys (e.g., 160 bits), and l>k can be thought of as a security parameter for discrete-log-based public keys (e.g., 1024 or 2048 bits). Let $\{0,1\}^*$ denote the set of finite binary strings and $\{0,1\}^n$ denote the set of binary strings of length n. A real-valued function $\epsilon(n)$ is negligible if for every c>0, there exists $n_c>0$ such that $\epsilon(n)-1/n^c$ for all $n>n_c$. Let q of size at least k and p of size l be primes such that p=rq+1 for some value r co-prime to q. Let g be a generator of a subgroup of $Z_p^*$ of size q. Call this subgroup $G_{p,q}$.

Figure 1:
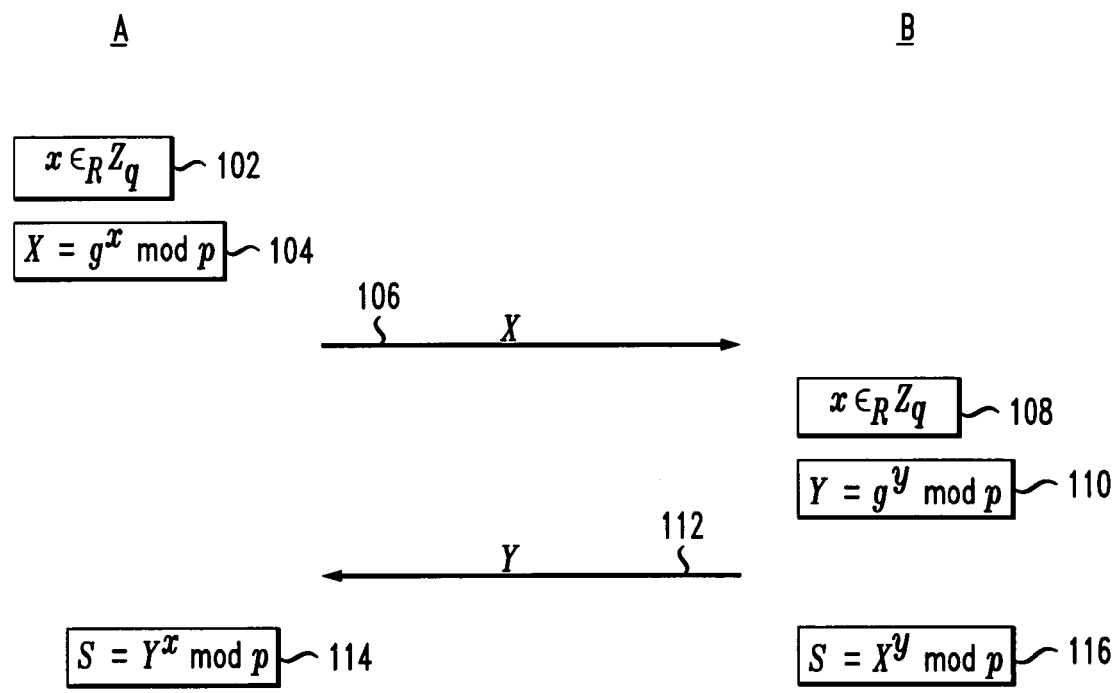
FIG. 1 illustrates the Diffie-Hellman key exchange protocol.

A key exchange protocol called Diffie-Hellman Key Exchange and described in W. Diffie and M. Hellman, *New Directions in Cryptography*, IEEE Transactions on Information Theory, vol. 22, no. 6, 644–654, 1976, the disclosure of which is incorporated by reference herein, is based on the modular exponentiation function. Specifically, two parties A and B agree on a secret key in accordance with the protocol described in conjunction with FIG. 1. In step 102, A chooses a random x from the group $Z_q$ (i.e., $x \in_R Z_q$) where $Z_q=\{0, 1, \ldots, q-1\}$ (or simply the integers mod q). In step 104, A computes $X=g^x$ mod p. In step 106, A transmits X to B. In step 108, B chooses a random y from $Z_q$ (i.e., $y \in_R Z_q$) In step 110, B computes $Y=g^y$ mod p and transmits Y to A in step 112. At this point, a shared secret $g^{xy}$ (i.e., a secret key) can be computed by both A and B. Note that herein below we may ignore the mod p notation for notational simplicity if it is clear that we are working in mod p. Since $X=g^x$ was transmitted from A to B in step 106, B can calculate the shared secret $g^{xy}$ by computing $X^y$ instep 116. Similarly, since $Y=g^y$ was transmitted from B to A in step 112, A can calculate the shared secret $g^{xy}$ by computing $Y^x$ in step 114. The shared secret S can now be used by A and B as a session key for secure communication.

Diffie-Hellman key exchange can also be performed over other groups in which the discrete log function is difficult to compute, such as certain elliptic curve groups. Groups are well-known in the art, as described in I. N. Herstein, Topics in Algebra, 2nd edition, John Wiley & Sons, New York, 1975, the disclosure of which is incorporated by reference herein, as follows. A nonempty set of elements G is said to form a group if in G there is defined a binary operation, called the product and denoted by·, such that:

1. a, b $\in$ G implies that a·b $\in$ G (closed).
2. a, b, c, $\in$ G implies that a·(b·c)=(a·b)·c (associative law).
3. There exists an element e $\in$ G such that a·e=e·a=a for all a $\in$ G (the existence of an identity element in G).
4. For every a $\in$ G there exists an element $a^{-1} \in$ G such that $a \cdot a^{-1} = a^{-1} \cdot a = e$ (the existence of inverses in G).

Thus, more generally, Diffie-Hellman key exchange operates in a specific group where the secret keys x and y are indices to elements of the group. Thus, consider a group G with a group generator g $\in$ G and G={g, g·g, g·g·g, g·g·g·g, . . . } where · is the group operation. As examples, if the group operation · for G is multiplication, then G={$g^1$, $g^2$, $g^3$, $g^4$, . . . }. If the group operation · for G is addition, then G={1g, 2g, 3g, 4g, . . . }. Since the present invention may be implemented using different groups, as used herein below, the notation $g^x$ means that the group operation is applied x times on the group generator g. Further, for every group, there is also an inverse group operation represented herein as –. As used herein below, the inverse group operation is defined as follows. The inverse group operation on x and y, i.e., $$\frac{x}{y},$$

is defined as $x \cdot y^{-1}$.

Figure 2:
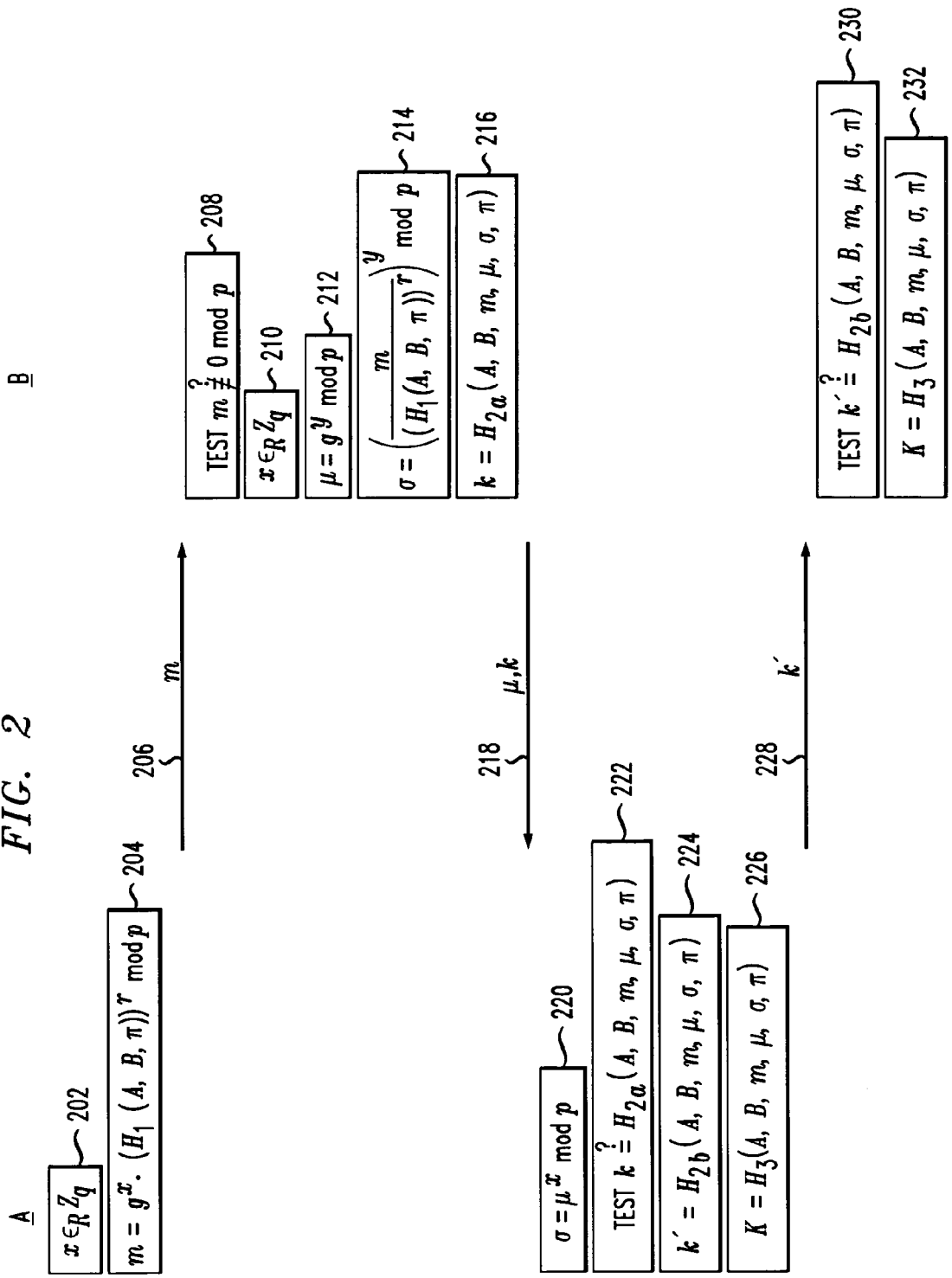
FIG. 2 illustrates a mutual authentication and key exchange protocol in which both parties possess a shared password.

FIG. 2 illustrates a mutual authentication and key exchange protocol in accordance with an explicit authentication approach in which both parties possess a shared password. The communication protocol in FIG. 2 is disclosed in the above-referenced U.S. patent application identified by Ser. No. 09/638,320, filed on Aug. 14, 2000 in the name of V. V. Boyko et al. and entitled "Secure Mutual Network Authentication and Key Exchange Protocol." In general, the communication protocol uses a Diffie-Hellman type shared secret, but modified such that the two parties may authenticate each other using a shared password. Further, it has been proven that this protocol is secure.

In accordance with FIG. 2, steps shown on the left side of the figure are performed by a first party A, and steps shown on the right side of the figure are performed by a second party B. Typically, A is a client machine (computer system) and B is a server machine (computer system). However, this is not required, and A and B are referred to as client and server, respectively, only as an example to show the typical case. Thus, it is to be understood that the approach shown in FIG. 2 is not limited to the case where A and B are client and server, but instead is applicable to any two parties A and B. Arrows represent communication between the parties. In accordance with the protocol, the server authenticates itself to the client and the client authenticates itself to the server. After both sides have authenticated, each generates a secret session key which may be used for subsequent secure communication.

Prior to initiation of the protocol, it is assumed that the client and the server are in possession of a password π which the client uses to authenticate with the server.

It is noted that the following protocol authenticates both the server and the client. Thus, neither the server nor the client are assumed to be authentic, and thus either the server or the client may be an adversary. The client may be an adversary attempting to authenticate itself and gain access to the server. The server may be an adversary attempting to spoof another authentic server in an attempt to gain sensitive information from an unsuspecting client.

Returning now to FIG. 2, in step 202, the client chooses a random value for the index x from $Z_q$. Then, in step 204, the client computes a parameter m as $m=g^x \cdot (H_1(A, B, \pi))^r$ mod p, where A is a unique identifier of the client, B is a unique identifier of the server, π is the client's password for this particular server, $H_1$ is a random hash function, and·represents the group operation. $H_1(A, B, \pi)$ is raised to the r power in order to ensure that the result is within $G_{\{pq\}}$. Informally, a function H from a set S to a set T will be called a random hash function if the output of H looks random or at least is unpredictable until the function is computed with an input x in S. Since $H_1$ must output something that looks random in $Z_p^*$, it should output |p|+sec bits (where |p| is the number of bits of p and sec is the security parameter. The security parameter may be, for example, 160. Known functions that generally behave this way are SHA-1, described in FIPS 180-1, *Secure Hash Standard*, Federal Information Processing Standards Publication 180-1, 1995; and RIPEMD-160, described in H. Dobbertin, A. Bosselaers, B. Preneel, *RIPEMD-160: a strengthened version of RIPEMD*, In Fast Software Encryption, 3rd Intl. Workshop, 71–82, 1996, the disclosures of which are incorporated by reference herein.

The tuple (A, B, π) is used, rather than only the password, in order to ensure that it is unique for each client-server pair. The password alone is all that is required for heuristic security, but, as discussed in further detail below, the client and server names are used to ensure a formal proof of security. Thus, in accordance with the protocol in FIG. 2, a function of at least the password is combined with the Diffie-Hellman value $g^x$ by performing the group operation on the function of at least the password and the Diffie-Hellman value $g^x$. This is an important step of the protocol as it ensures that the Diffie-Hellman value $g^x$ may only be extracted from the parameter m by someone who has knowledge of the password. This extraction of the Diffie Hellman value $g^x$ will be described in further detail below in conjunction with step 214. In step 206, the client transmits the parameter m to the server.

Upon receipt of the parameter m, the server tests the parameter value in step 208 to ensure that the value is not 0 mod p. If the value is 0 mod p, the server terminates the protocol because 0 is not in $Z_p^*$. Otherwise, in step 210, the server chooses a random value for the index y from $Z_q$. In step 212, the server assigns a parameter μ to the computed Diffie-Hellman value $g^y$. Next, in step 214, the server computes the Diffie-Hellman shared secret $g^{xy}$ (referred to as σ in this protocol) using the received parameter m as follows:

$$\sigma = \left(\frac{m}{(H_1(A, B, \pi))^r}\right)^y$$

mod p. We will now describe this step in further detail (leaving out the mod p notation for notational simplicity). First, it should be recalled that, as described above, for every group operation, there is an inverse group operation such that the inverse group operation on x and y, i.e.

$$\frac{x}{y},$$

is defined as $x \cdot y^{-1}$. Thus, one skilled in the art would recognize that the calculation of $$\frac{m}{(H_1(A, B, \pi))^r}$$

in step 214 is performing the inverse group operation on m and the function of at least the password. Substituting the value of m from step 204, we have $$\frac{g^x \cdot (H_1(A, B, \pi))^r}{(H_1(A, B, \pi))^r} = g^x.$$

Thus, if the server has possession of the correct password π, then the server can extract the Diffie Hellman value $g^x$ from the value of the received parameter m. Thus, the computation in step 214 results in the server generating the Diffie-Hellman shared secret $g^{xy}$.

Next, in step 216, the server computes k=$H_{2a}$ (A, B, m, μ, σ,π), where $H_{2a}$ is another random hash function which must output sec bits, where sec is the security parameter. The parameter k will be used by the client A, as described below, to authenticate that the server is in possession of the correct password. In step 218, the server transmits parameters μ and k to the client.

Upon receipt of parameters μ and k, the client computes σ=$μ^x$ mod p in step 220. Since μ=$g^y$, $μ^x$=$g^{xy}$, which is the Diffie-Hellman shared secret. In step 222, the client computes $H_{2a}$ (A, B, m, μ, σ, π) using its own knowledge of π and tests whether the result is equal to the parameter k received from the server in step 218. If they are the same, then the client has authenticated the server. If they are not the same, then the client terminates the protocol as the server has not authenticated itself. In step 224, the client computes k'=$H_{2b}$ (A, B, m, μ, σ, π) which will be used by the server to authenticate the client as described below. In step 226, the client generates session key K as K=$H_3$(A, B, m, μ, σ, π). In step 228, the client transmits k' to the server. Again, $H_{2b}$ and $H_3$ are random hash functions which must output sec bits, where sec is the security parameter.

In step 230, the server computes $H_{2b}$ (A, B, m, μ, σ, π) using its own knowledge of π grand tests whether the result is equal to the parameter k' received from the client in step 228. If they are the same, then the server has authenticated the client. If they are not the same, then the server terminates the protocol as the client has not authenticated itself. In step 232, the server generates session key K as K=$H_3$ (A, B, m, μ, σ, π).

At this point, both the client and server have authenticated with each other, and both the client and the server have generated the same secure session key K, which may be used for subsequent secure communication between the client and the server.

Thus, while the communication protocol of FIG. 2 provides the advantages of key exchange with password-based authentication, the generation of the parameter m as $g^x \cdot (H_1 (A, B, \pi))^r$ mod p can be computationally intense. This can be problematic when the client device does not possess the computational resources to adequately perform this portion of the protocol. This maybe the case when the client A is a smaller, slower device such as an older generation personal computer, a smartcard, or a handheld personal digital assistant (PDA), to name a few examples. Also, while B may be a server and is assumed to be more computationally equipped than the client, the protocol may be performed between two client-type devices and thus computational efficiency is important on both sides of the protocol. A solution which is able to reduce the client-side computation by at least a factor of two is provided in accordance with the present invention and illustrated in the context of FIG. 3.

Figure 3:
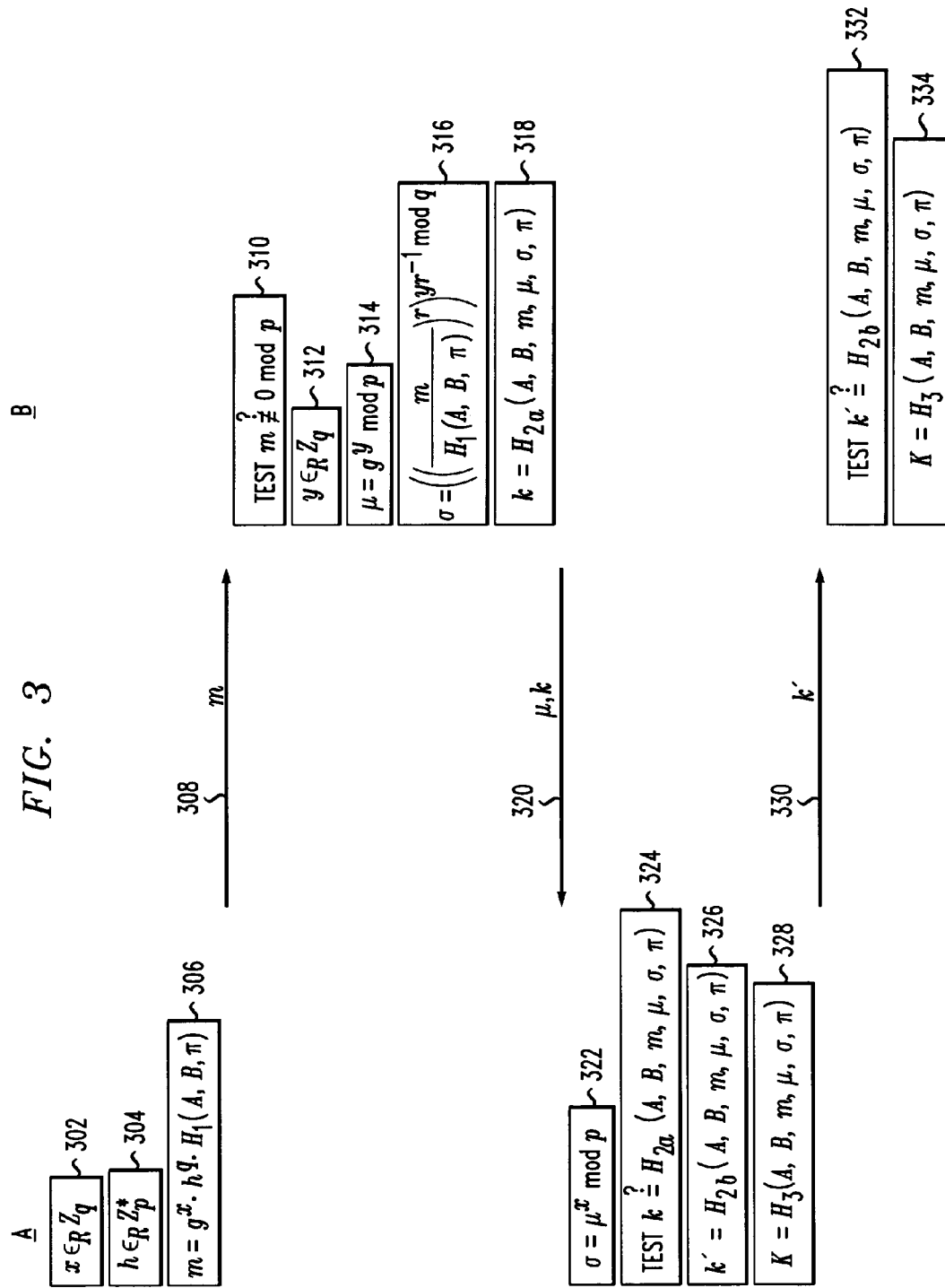
FIG. 3 illustrates an improved efficiency mutual authentication and key exchange protocol in accordance with an embodiment of the present invention in which both parties possess a shared password.

Referring now to FIG. 3, an improved efficiency mutual authentication and key exchange protocol is provided in accordance with an embodiment of the present invention in which both parties possess a shared password. The communication protocol is a secure password-authenticated key exchange protocol and assumes the hardness of the Decision Diffie-*Hellman problem (DDH)* in $G_{p,q}$. Let DH(X, Y) denote the Diffie-Hellman value $g^{xy}$ of $X=g^x$ and $Y=g^y$, as described above. One formulation is that given g, X, Y, Z in $G_{p,q}$, where $X=g^x$ and $Y=g^y$ are chosen randomly, and Z is either DH(X, Y) or random, each with half probability, determine if Z=DH(X, Y). Breaking DDH implies constructing a polynomial-time adversary that distinguishes Z=DH(X, Y) from a random Z with non-negligible advantage over a random guess.

Further, we define hash functions $H_{2a}$, $H_{2b}$, $H_3$:{0, 1}*→{0, 1}$^\kappa$ and $H_1$:{0,1}*→{0,1}$^\eta$, where $\eta \geq 1+\kappa$. We also assume that $H_1$, $H_{2a}$, H 2b, and $H_3$ are independent random functions, as used above in the approach of FIG. 2. Note that while $H_1$ is described as returning a bit string, we operate on its output as a number modulo p.

In accordance with the communication protocol of FIG. 2, note that the client performs two |q|-bit exponentiations (steps 204 and 220), and one |r|-bit exponentiation (step 204). As will be explained below in the context of FIG. 3, in accordance with a communication protocol of the present invention, the client only needs to perform three |q|-bit exponentiations, which generally require much less computation as compared with the protocol of FIG. 2. The invention is able to provide such an advantage in the following manner. Instead of forcing the result of the hash function used to generate parameter m to be in the group $G_{p,q}$, we allow the result of the hash function to be any element in $Z_p^*$, and randomize that part of the hash function result outside of $G_{p,q}$. This makes the m value indistinguishable from a random value in $Z_p^*$ (instead of a random value in $G_{p,q}$), but still allows one to extract the hash value and the extra randomization.

In this case, we have p=rq+1 in which gcd(r,q)=1 (where gcd stands for greatest common divisor), in order to extract the extra randomization. Of course, for randomly chosen q and p (for instance, using the NIST approved algorithm described in U.S. Department of Commerce/NIST, Springfield, Va., FIPS186, "Digital Signature Standard," Federal Information Processing Standards Publication 186, 1994, the disclosure of which is incorporated by reference herein), this relation may be satisfied with high probability.

As with FIG. 2, steps shown on the left side of FIG. 3 are performed by a first party A, and steps shown on the right side of FIG. 3 are performed by a second party B. Again, A is referred to as a client machine (computer system) and B as a server machine (computer system) only as an example to show a typical case. Thus, it is to be understood that the protocol shown in FIG. 3 is applicable to any two entities or parties A and B. Again, arrows represent communication between the parties. In accordance with the protocol of FIG. 3, the server authenticates itself to the client and the client authenticates itself to the server. Thus, neither the server nor the client are assumed to be authentic, and thus either the server or the client may be an adversary, as explained above. After both sides have authenticated, each generates a secret session key which may be used for subsequent secure communication.

As with the FIG. 2 protocol, prior to initiation of the FIG. 3 protocol of the invention, it is assumed that the client and the server are in possession of a password π which the client uses to authenticate with the server.

Returning now to FIG. 3, in step 302, the client chooses a random value for the index x from $Z_q$ (i.e., $x \in_R Z_q$). In step 304, the client chooses a random value h from the group $Z_p^*$ (i.e., $h \in_R Z_p^*$). Then, in step 306, the client computes a parameter m as $m=g^x \cdot h^q \cdot H_1$ (A, B, π), where A is a unique identifier of the client, B is a unique identifier of the server, $H_1$ is the client's password for this particular server, $H_1$ is a random hash function, · represents the group operation, and $h^q$ is a randomization operation. Recall that in the protocol of FIG. 2, $H_1$ (A, B, π) is raised to the r power in order to ensure that the result is within $G_{p,q}$. However, in accordance with the present invention, instead of forcing the result of the hash function used to generate parameter m to be in the group $G_{p,q}$, the protocol of FIG. 3 allows the result of the hash function to be any element in $Z_p^*$, and randomizes that part of the hash function result outside of $G_{p,q}$. This is accomplished via the randomization operation $h^q$. This makes the m value indistinguishable from a random value in instead of a random value in $G_{p,q}$, but still allows the server B to extract the hash value and the extra randomization. Advantageously, by raising the random parameter h to the exponent q, everything in the result of the hash function outside of the subgroup $G_{p,q}$ is randomized.

As explained above, a function H from a set S to a set T will be called a random hash function if the output of H looks random or at least is unpredictable until the function is computed with an input x in S. Thus, since $H_1$ must output something that looks random in $Z_p^*$, it should output |p|+sec bits (where |p| is the number of bits of p and sec is the security parameter. The security parameter may be, for example, 160. Again, the SHA-1 or the RIPEMD-160 are known functions that generally behave this way.

As in the protocol of FIG. 2, the tuple (A, B, π) is used, rather than only the password, in order to ensure that it is unique for each client-server pair. The password alone is all that is required for heuristic security, but the client and server names may be used to ensure a formal proof of security. Thus, in accordance with the protocol in FIG. 3, a function of at least the password is combined with the Diffie-Hellman value $g^x$ by performing the group operation on the function of at least the password and the Diffie-Hellman value $g^x$. Again, this is an important step of the protocol as it ensures that the Diffie-Hellman value $g^x$ may only be extracted from the parameter m by someone who has knowledge of the password. In step 308, the client transmits the parameter m to the server.

Upon receipt of the parameter m, the server tests the parameter value in step 310 to ensure that the value is not 0 mod p. If the value is 0 mod p, the server terminates the protocol because 0 is not in $Z_p^*$. Otherwise, in step 312, the server chooses a random value for the index y from $Z_q$. In step 314, the server assigns a parameter μ to the computed Diffie-Hellman value $g^y$. Next, in step 316, the server computes the Diffie-Hellman shared secret $g^{xy}$ (referred to as σ in this protocol) using the received parameter m as follows:

$$\sigma = \left(\left(\frac{m}{H_1(A, B, \pi)}\right)^r\right)^{yr^{-1} \bmod q}.$$

We will now describe this step in further detail. First, it should be recalled that, as described above, for every group operation, there is an inverse group operation such that the inverse group operation on x and y, i.e.

$$\frac{x}{y},$$

is defined as $x \cdot y^{-1}$. Thus, one skilled in the art would recognize that the calculation of $$\sigma = \left(\left(\frac{m}{H_1(A, B, \pi)}\right)^r\right)^{yr^{-1} \bmod q}$$

in step 316 is performing the inverse group operation on m and the function of at least the password, as well as extracting the randomization associated with the client random operation $h^q$. Substituting the value of m from step 306, we get $g^x$. Thus, if the server has possession of the correct password $\pi$, then the server can extract the Diffie Hellman value $g^x$ from the value of the received parameter m. Thus, the computation in step 316 results in the server generating the Diffie-Hellman shared secret $g^{xy}$.

Next, in step 318, the server computes $k=H_{2a}$ (A, B, m, µ, σ, π), where $H_{2a}$ is another random hash function which must output sec bits, where sec is the security parameter. The parameter k will be used by the client A, as described below, to authenticate that the server is in possession of the correct password. In step 320, the server transmits parameters µ and k to the client.

Upon receipt of parameters µ and k, the client computes σ=µ$^x$ mod p in step 322. Since µ=g$^y$, µ$^x$=g$^{xy}$, which is the Diffie-Hellman shared secret. In step 324, the client computes $H_{2a}$ (A, B, m, µ, σ, π) using its own knowledge of π and tests whether the result is equal to the parameter k received from the server in step 320. If they are the same, then the client has authenticated the server. If they are not the same, then the client terminates the protocol as the server has not authenticated itself. In step 326, the client computes k'=$H_{2b}$ (A, B, m, µ, σ, π) which will be used by the server to authenticate the client as described below. In step 328, the client generates session key K as K=$H_3$ (A, B, m, µ, σ, π). In step 330, the client transmits k' to the server. Again, $H_{2b}$ and $H_3$ are random hash functions which must output sec bits, where sec is the security parameter.

In step 332, the server computes $H_{2b}$ (A, B, m, µ, σ, π) using its own knowledge of π and tests whether the result is equal to the parameter k' received from the client in step 330. If they are the same, then the server has authenticated the client. If they are not the same, then the server terminates the protocol as the client has not authenticated itself. In step 334, the server generates session key K as K=$H_3$ (A, B, m, µ, σ, π).

At this point, both the client and server have authenticated with each other, and both the client and the server have generated the same secure session key K, which may be used for subsequent secure communication between the client and the server.

As mentioned above, the communication protocol of the invention, as illustrated in the context of FIG. 3, reduces the client-side computation by at least a factor of two, as compared to the protocol of FIG. 2. This is evident from the following example. Assume p is a 1024 bit prime, and q is a 160 bit prime. Then, r is 864 bits. Every exponentiation in $Z_p^*$ takes time proportional to the number of bits of the exponent. Then, in the protocol of FIG. 2, where two q-bit exponentiations and one r-bit exponentiation are performed, the time is proportional to 2*160+864=1184, while in the protocol of the invention (as illustrated in FIG. 3) where three q-bit exponentiations are performed, the time is proportional to 3*160=480. Advantageously, this value (480) is less than half the value associated with the FIG. 2 protocol (1184).

Figure 4:
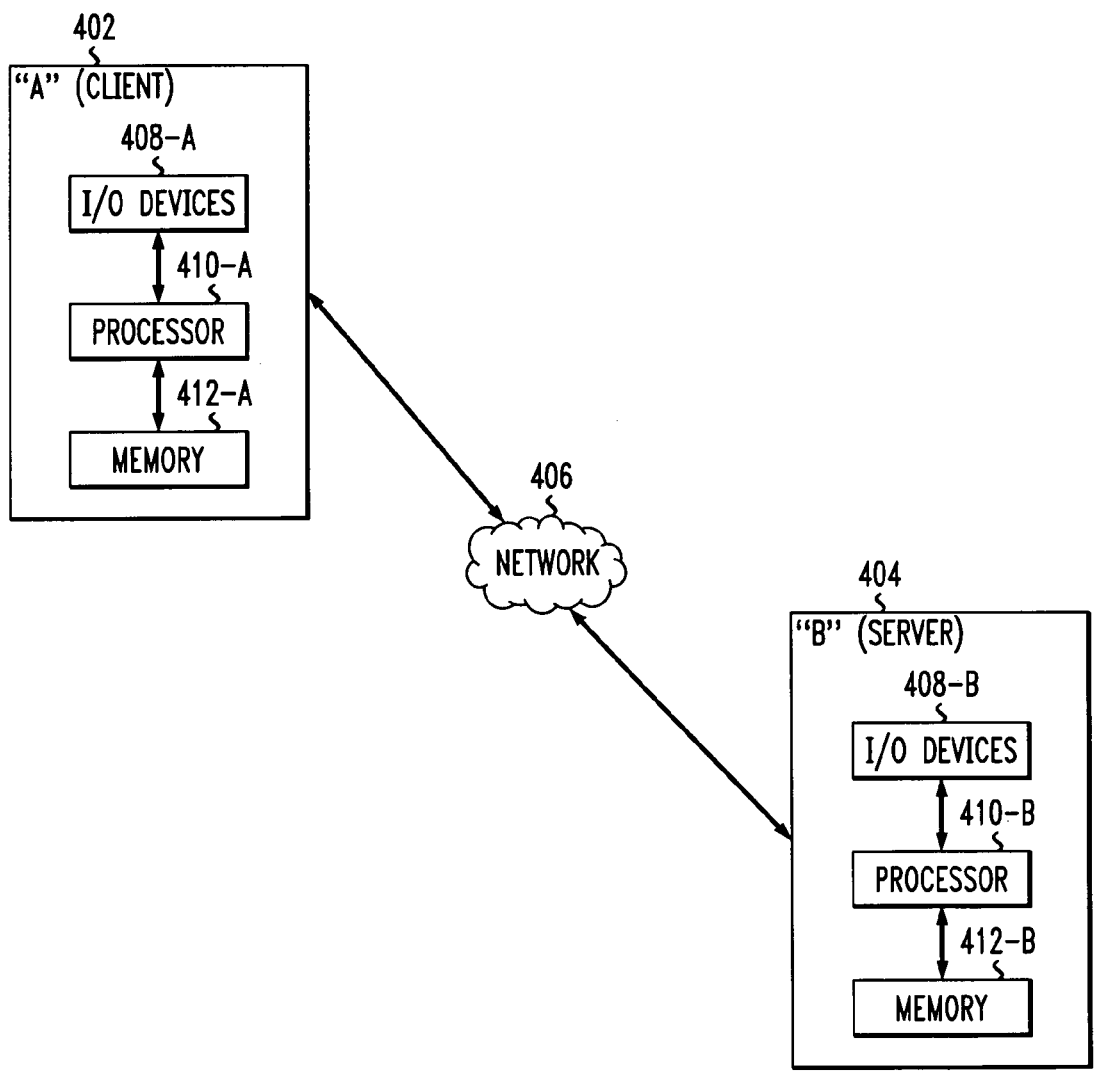
FIG. 4 illustrates a generalized hardware architecture of a data network and computer systems suitable for implementing one or more of the password-authenticated key exchange methodologies according to the present invention.

FIG. 4 illustrates a generalized hardware architecture of a data network and computer systems suitable for implementing a password-authenticated key exchange methodology between two entities A and B according to the present invention. As shown, entity A comprises a computer system 402, while entity B comprises a computer system 404. The two computer systems 402 and 404 are coupled via a data network 406. The data network may be any data network across which A and B desire to communicate, e.g., the Internet. However, the invention is not limited to a particular type of network. Typically, and as labeled in FIG. 4, A is a client machine and B is a server machine. However, this is not required, and A and B are referred to as client and server, respectively, only as an example to show the typical case. Thus, it is to be understood that the communication protocol of the present invention is not limited to the case where A and B are client and server, but instead is applicable to any computing devices comprising A and B.

As would be readily apparent to one of ordinary skill in the art, the server and client may be implemented as programmed computers operating under control of computer program code. The computer program code would be stored in a computer readable medium (e.g., a memory) and the code would be executed by a processor of the computer. Given this disclosure of the invention, one skilled in the art could readily produce appropriate computer program code in order to implement the protocols described herein.

Nonetheless, FIG. 4 generally illustrates an exemplary architecture for each computer system communicating over the network. As shown, the client device comprises I/O devices 408-A, processor 410-A, and memory 412-A. The server system comprises I/O devices 408-B, processor 410-B, and memory 412-B. It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. For example, while the teachings of the invention have been illustrated in the context of a communication protocol which provides computational efficiencies over the communication protocol described above in FIG. 2, it is to be understood that the invention may be applied in the context of other communication protocols. For example, the randomization operation of the invention may be employed in accordance with other protocol embodiments described in the above-referenced U.S. patent application identified by Ser. No. 09/638,320, filed on Aug. 14, 2000 in the name of V. V. Boyko et al. and entitled "Secure Mutual Network Authentication and Key Exchange Protocol." For example, the invention may be employed in accordance with the implicit authentication approach of the above-reference application, as well as with the password verifier approach described therein. Furthermore, while certain parameters are used in evaluating the hash functions of the communication protocol of the invention, it is to be understood that not all parameters are required for heuristic security. That is, additional parameters are used to allow the protocol to be formally proven secure. For example, in the hash functions used in steps 318, 324, 326, 328, 332, and 334, only the parameter σ in the function may be needed to make the protocol heuristically secure.

What is claimed is:

1. A method for communication via a data network, between two parties that share a password, using a Diffie-Hellman type key exchange on a particular group to generate a shared secret $g^{xy}$, where g is the group generator known to both parties and x is an index known to one party and y is an index known to the other party, the group having a group operation and an inverse group operation, the method comprising the steps of:

one party generating a parameter m by performing the group operation on $g^x$ and a function of at least the password, wherein any portion of a result associated with the function that is outside the group is randomized, and transmitting m to the other party, whereby the other party may perform the inverse group operation on m and the function of at least the password, and remove the randomization of any portion of the result associated with the function that is outside the group, to extract $g^x$ and calculate the shared secret $g^{xy}$.

2. The method of claim 1, wherein the particular group, denoted as $G_{p,q}$, is a sub-group of a group $Z_p^*$ where p and q are prime numbers such that p equals rq+1 for a value r co-prime to q, and wherein the step of randomizing any portion of a result associated with the function that is outside the group $G_{p,q}$ is performed by computing a parameter h, randomly selected from the group $Z_p^*$, raising the parameter h to the exponent q and multiplying $h^q$ by the result associated with the function.

3. The method of claim 1, wherein the one party is a client and the other party is a server.

4. The method of claim 1, further comprising the step of:
the one party receiving $g^y$ from the other party and generating the shared secret $g^{xy}$.

5. The method of claim 4, further comprising the step of:
the one party authenticating the other party by comparing a received value against a function of at least one of an identifier of the one party, an identifier of the other party, m, $g^y$, the shared secret, and the password.

6. The method of claim 4, further comprising the step of:
the one party transmitting a function of at least one of an identifier of the one party, an identifier of the other party, m, $g^y$, the shared secret, and the password, to the other party whereby the other party may authenticate the one party.

7. The method of claim 4 further comprising the step of:
the one party generating a session key as a function of at least one of an identifier of the one party, an identifier of the other party, m, $g^y$, the shared secret, and the password.

8. A method for communication via a data network, between two parties that share a password, using a Diffie-Hellman type key exchange on a particular group to generate a shared secret $g^{xy}$, where g is the group generator known to both parties and x is an index known to one party and y is an index known to the other party, the group having a group operation and an inverse group operation, the method comprising the steps of:

responsive to the one party generating a parameter m by performing the group operation on $g^x$ and a function of at least the password, wherein any portion of a result associated with the function that is outside the group is randomized, and transmitting m to the other party, the other party performing the inverse group operation on m and the function of at least the password, removing the randomization of any portion of the result associated with the function that is outside the group, extracting $g^x$, and calculating the shared secret $g^{xy}$.

9. The method of claim 8, wherein the particular group, denoted as $G_{p,q}$, is a sub-group of a group $Z_p^*$ where p and q are prime numbers such that p equals rq+1 for a value r co-prime to q, and wherein the step of randomizing any portion of a result associated with the function that is outside the group $G_{p,q}$ is performed by computing a parameter h, randomly selected from the group $Z_p^*$, raising the parameter h to the exponent q and multiplying $h^q$ by the result associated with the function.

10. In accordance with a protocol for communication over a data network between two parties that share a password, using a Diffie-Hellman type key exchange on a particular group to generate a shared secret $g^{xy}$, where g is the group generator known to both parties and x is an index known to one party and y is an index known to the other party, the group having a group operation and an inverse group operation, apparatus associated with the one party comprising:

at least one processor operative to: (i) generate a parameter m by performing the group operation on $g^x$ and a function of at least the password, wherein any portion of a result associated with the function that is outside the group is randomized; and (ii) transmit m to the other party, whereby the other party may perform the inverse group operation on m and the function of at least the password, and remove the randomization of any portion of the result associated with the function that is outside the group, to extract $g^x$ and calculate the shared secret $g^{xy}$.

11. The apparatus of claim 10, wherein the particular group, denoted as $G_{p,q}$, is a sub-group of a group $Z_p^*$ where p and q are prime numbers such that p equals rq+1 for a value r co-prime to q, and wherein the step of randomizing any portion of a result associated with the function that is outside the group $G_{p,q}$ is performed by computing a parameter h, randomly selected from the group $Z_p^*$, raising the parameter h to the exponent q and multiplying $h^q$ by the result associated with the function.

12. The apparatus of claim 10, wherein the one party is a client and the other party is a server.

13. The apparatus of claim 10, wherein the at least one processor associated with the one party is further operative to receive $g^y$ from the other party and generate the shared secret $g^{xy}$.

14. The apparatus of claim 13, wherein the at least one processor associated with the one party is further operative to authenticate the other party by comparing a received value against a function of at least one of an identifier of the one party, an identifier of the other party, m, $g^y$, the shared secret, and the password.

15. The apparatus of claim 13, wherein the at least one processor associated with the one party is further operative to transmit a function of at least one of an identifier of the one party, an identifier of the other party, m, $g^y$, the shared secret, and the password, to the other party whereby the other party may authenticate the one party.

16. The apparatus of claim 13, wherein the at least one processor associated with the one party is further operative to generate a session key as a function of at least one of an identifier of the one party, an identifier of the other party, m, $g^y$, the shared secret, and the password.

17. In accordance with a protocol for communication over a data network between two parties that share a password, using a Diffie-Hellman type key exchange on a particular group to generate a shared secret $g^{xy}$, where g is the group generator known to both parties and x is an index known to one party and y is an index known to the other party, the group having a group operation and an inverse group operation, apparatus associated with the other party comprising:
  at least one processor operative to, in response to the one party generating a parameter m by performing the group operation on $g^x$ and a function of at least the password, wherein any portion of a result associated with the function that is outside the group is randomized, and transmitting m to the other party: (i) perform the inverse group operation on m and the function of at least the password; (ii) remove the randomization of any portion of the result associated with the function that is outside the group; (iii) extract $g^x$; and (iv) calculate the shared secret $g^{xy}$.

18. The apparatus of claim 17, wherein the particular group, denoted as $G_{p,q}$, is a sub-group of a group $Z_p^*$ where p and q are prime numbers such that p equals rq+1 for a value r co-prime to q, and wherein the step of randomizing any portion of a result associated with the function that is outside the group $G_{p,q}$ is performed by computing a parameter h, randomly selected from the group $Z_p^*$, raising the parameter h to the exponent q and multiplying $h^q$ by the result associated with the function.

19. An article of manufacture for communication via a data network, between two parties that share a password, using a Diffie-Hellman type key exchange on a particular group to generate a shared secret $g^{xy}$, where g is the group generator known to both parties and x is an index known to one party and y is an index known to the other party, the group having a group operation and an inverse group operation, the article comprising a machine readable medium containing one or more programs which when executed implement the steps of:
  one party generating a parameter m by performing the group operation on $g^x$ and a function of at least the password, wherein any portion of a result associated with the function that is outside the group is randomized, and transmitting m to the other party, whereby the other party may perform the inverse group operation on m and the function of at least the password, and remove the randomization of any portion of the result associated with the function that is outside the group, to extract $g^x$ and calculate the shared secret $g^{xy}$.

20. An article of manufacture for communication via a data network, between two parties that share a password, using a Diffie-Hellman type key exchange on a particular group to generate a shared secret $g^{xy}$, where g is the group generator known to both parties and x is an index known to one party and y is an index known to the other party, the group having a group operation and an inverse group operation, the article comprising a machine readable medium containing one or more programs which when executed implement the steps of:
  responsive to the one party generating a parameter m by performing the group operation on $g^x$ and a function of at least the password, wherein any portion of a result associated with the function that is outside the group is randomized, and transmitting m to the other party, the other party performing the inverse group operation on m and the function of at least the password, removing the randomization of any portion of the result associated with the function that is outside the group, extracting $g^x$, and calculating the shared secret $g^{xy}$.

* * * * *